(12) United States Patent
Zhu

(10) Patent No.: US 11,859,673 B2
(45) Date of Patent: Jan. 2, 2024

(54) CLUTCH TYPE DRIVING WHEEL OF ELECTRIC SCOOTER

(71) Applicant: HANGZHOU SPEED CONTROL SOFTWARE CO., LTD, Zhejiang (CN)

(72) Inventor: Xiaokai Zhu, Zhejiang (CN)

(73) Assignee: HANGZHOU SPEED CONTROL SOFTWARE CO., LTD, Zhejiang (CN)

( * ) Notice: Subject to any disclaimer, the term of this patent is extended or adjusted under 35 U.S.C. 154(b) by 262 days.

(21) Appl. No.: 17/420,081

(22) PCT Filed: Dec. 31, 2019

(86) PCT No.: PCT/CN2019/130788
§ 371 (c)(1),
(2) Date: Jun. 30, 2021

(87) PCT Pub. No.: WO2020/140910
PCT Pub. Date: Jul. 9, 2020

(65) Prior Publication Data
US 2022/0082134 A1    Mar. 17, 2022

(30) Foreign Application Priority Data

Dec. 31, 2018  (CN) .......................... 201811652107.9

(51) Int. Cl.
*F16D 11/14*    (2006.01)
*B60B 27/04*    (2006.01)
(Continued)

(52) U.S. Cl.
CPC .............. *F16D 11/14* (2013.01); *B60B 27/04* (2013.01); *B62M 7/12* (2013.01); *F16D 3/223* (2013.01); *F16D 2003/22326* (2013.01)

(58) Field of Classification Search
CPC .......... F16D 11/14; F16D 41/20; F16D 41/04; B60B 27/047
See application file for complete search history.

(56) References Cited

U.S. PATENT DOCUMENTS

| 4,116,320 A | 9/1978 | Quilliam |
| 5,692,590 A | 12/1997 | Iihara et al. |
| (Continued) | | |

FOREIGN PATENT DOCUMENTS

| CN | 2868972 | 2/2007 |
| CN | 205780419 | 12/2016 |
| (Continued) | | |

OTHER PUBLICATIONS

International Search Report, issued in the corresponding PCT application No. PCT/CN2019/130788, dated Mar. 24, 2020, 8 pages.

*Primary Examiner* — Stacey A Fluhart
(74) *Attorney, Agent, or Firm* — Hamre, Schumann, Mueller & Larson, P.C.

(57) ABSTRACT

Provided is a clutch type driving wheel of an electric scooter. The clutch type driving wheel of the electric scooter includes a wheel body and a power shaft penetrating through the center of the wheel body, wherein a motor power input structure is arranged at one end of the power shaft, a central supporting shaft penetrates through the power shaft, a controlled clutch structure enabling the wheel body to be circumferentially positioned relative to the power shaft or enabling the wheel body to circumferentially rotate relative to the power shaft when the controlled clutch structure acts is arranged between the power shaft and the wheel body, and a clutch state locking structure is arranged on the controlled clutch structure. According to the clutch type driving wheel of the electric scooter, the clutch state locking structure is arranged between the power shaft and the wheel body. It is (Continued)

ensured that when the power shaft and the wheel body are in a transmission connection state or a mutual separation state, the state stability can be maintained.

10 Claims, 3 Drawing Sheets

(51) Int. Cl.
*B62M 7/12* (2006.01)
*F16D 3/223* (2011.01)

(56) References Cited

U.S. PATENT DOCUMENTS

| | | | | |
|---|---|---|---|---|
| 2015/0041235 | A1* | 2/2015 | Hadley | F16D 49/00 |
| | | | | 188/74 |
| 2019/0337382 | A1* | 11/2019 | Yu | B60K 17/14 |
| 2020/0096057 | A1* | 3/2020 | Mikasa | B60N 2/1685 |

FOREIGN PATENT DOCUMENTS

| | | |
|---|---|---|
| CN | 207140688 | 3/2018 |
| CN | 109707756 | 5/2019 |
| CN | 110081088 | 8/2019 |
| CN | 209724999 | 12/2019 |
| CN | 209925456 | 1/2020 |
| CN | 210083464 | 2/2020 |
| DE | 102017121541 A1 * | 3/2019 |

* cited by examiner

CLUTCH TYPE DRIVING WHEEL OF ELECTRIC SCOOTER

TECHNICAL FIELD

The present invention belongs to the technical field of a scooter, more particularly, to a clutch type driving wheel of an electric scooter.

BACKGROUND

The electric scooter is a kind of sports equipment that children love very much. It drives a driving wheel on the scooter by a motor to run. In the prior art, the driving wheel on the electric scooter consists of a wheel core provided with a tire and a belt pulley fixed on one side of the wheel core, wherein the belt pulley is in transmission connection with a power motor through a belt, and the motor drives the wheel core by the belt pulley to rotate. However, in practical application, when the electric scooter drags or slides when the motor is shut down, the rotating driving wheel in turn drives the motor to rotate, thereby increasing the traveling resistance and affecting the sliding of the scooter. Therefore, the driving wheel in the electric scooter needs to be separated from the motor through transmission when the motor is shut down, so that it is easy and labor-saving when the scooter drags or slides.

For this problem, people have also made exploration and research in their long-term production and living practice. For example, the Chinese utility model discloses a driving wheel of an electric scooter [Application Number: 201720468425.4]. The utility model includes a tire, a wheel core and a belt pulley arranged on one side of the wheel core, wherein a clutch device is arranged between one side of the wheel core and the belt pulley, the clutch device enables the wheel core to be connected to or separated from the belt pulley through transmission, the clutch device includes an end face gear, and at least three semi-cylinders extending rightwards and with inclined top surfaces are arranged on the right side of the end face gear; an inclined slope corresponding to the inclined top surface of each semi-cylinder on the right side of the end face gear is arranged on the left side of the belt pulley, and each inclined slope is provided with a concave hole in the left side of the belt pulley; engageable or separable end face inclined teeth are arranged on the left side of the end face gear and the right side of the wheel core respectively and correspondingly; and an annular groove is formed in an annular surface of the end face gear, the annular groove is provided with an O-shaped ring, and a top surface of the O-shaped ring is in sliding contact with an opposite inner ring surface of the wheel core.

According to the utility model, the clutch device is arranged between the wheel core and the belt pulley, and transmission connection or mutual separation between the wheel core and the belt pulley may be realized as required, but the clutch device cannot ensure the stability of the two states, that is, during use, it is liable to switch between the transmission connection and mutual separation of the wheel core and the belt pulley due to some accidental external factors, thereby bringing use obstacle to users, even causing damage to the users.

SUMMARY

An objective of the present invention is to provide a clutch mechanism for the above problem.

To achieve the above objective, the present invention adopts the following technical solutions:

a clutch type driving wheel of an electric scooter includes a wheel body and a power shaft penetrating through the center of the wheel body, wherein a motor power input structure is arranged at one end of the power shaft, a central supporting shaft penetrates through the power shaft, at least one first bearing is arranged between the power shaft and the central supporting shaft, at least one second bearing is arranged between the power shaft and the wheel body, a controlled clutch structure which enables the wheel body to be circumferentially positioned relative to the power shaft or enables the wheel body to circumferentially rotate relative to the power shaft when the controlled clutch structure acts is arranged between the power shaft and the wheel body, and a clutch state locking structure is arranged on the controlled clutch structure.

In the clutch type driving wheel of the electric scooter, the controlled clutch structure is arranged on the power shaft, the controlled clutch structure includes a clutch part capable of moving axially along the power shaft so as to enable the wheel body to be circumferentially positioned relative to the power shaft or enable the wheel body to circumferentially rotate relative to the power shaft, the clutch part is connected to a driving structure capable of converting rotating motion into axial movement of the clutch part along the power shaft, and the clutch state locking structure is arranged between the driving structure and the power shaft.

In the clutch type driving wheel of the electric scooter, an annular space is formed between the power shaft and the wheel body, the clutch part is arranged in the annular space, a concave-convex engagement structure is arranged between the front end of the clutch part and the wheel body, the concave-convex engagement structure is engaged when the clutch part is axially forward so as to circumferentially position the power shaft and the wheel body, the concave-convex engagement structure is separated when the clutch part is axially backward so as to circumferentially separate the power shaft and the wheel body, the rear end of the clutch part is connected to the driving structure, and the driving structure extends at least partially outside the annular space.

In the clutch type driving wheel of the electric scooter, the clutch part is cylindrical and sleeves the power shaft, a circumferential positioning and axial sliding structure is arranged between the clutch part and the power shaft, the concave-convex engagement structure includes several convex teeth which are arranged at the front end of the clutch part and distributed uniformly in a circumferential direction and several grooves which are formed in the inner side of the wheel body and distributed uniformly in the circumferential direction, and the convex teeth are capable of being arranged corresponding to the grooves and capable of being inserted into each other.

In the clutch type driving wheel of the electric scooter, at least one first leading-in inclined surface is arranged at the front end of each of the convex teeth; and at least one second leading-in inclined surface is arranged at a notch of each of the grooves.

In the clutch type driving wheel of the electric scooter, the circumferential positioning and axial sliding structure includes several axial sunken grooves arranged on the power shaft and several sliding strips arranged on the clutch part, and the sliding strips are arranged in one-to-one correspondence to the axial sunken grooves and are arranged in the axial sunken grooves.

In the clutch type driving wheel of the electric scooter, the driving structure includes a rotary driving piece, the rotary driving piece is provided with several spiral sliding grooves distributed at intervals in a circumferential direction, the clutch part is provided with several sliding protrusions distributed at intervals in the circumferential direction, and the spiral sliding grooves and the sliding protrusions are arranged in one-to-one correspondence manner and are in sliding connection; and the rotary driving piece is fixedly connected to a control rotary knob, and the clutch state locking structure is arranged between the control rotary knob and the power shaft.

In the clutch type driving wheel of the electric scooter, the clutch state locking structure includes an annular damping ring, several concave-convex deformation teeth are arranged on the annular damping ring, several concave-convex bodies are arranged at the outer end of the power shaft, the annular damping ring sleeves the periphery of the power shaft, rotary blockage is realized after the concave-convex deformation teeth of the annular damping ring extends over the concave-convex bodies, and the annular damping ring is fixedly connected to the control rotary knob.

In the clutch type driving wheel of the electric scooter, an annular groove is formed at the periphery of the power shaft, the concave-convex bodies are arranged in the annular groove, and the annular damping ring is embedded in the annular groove.

In the clutch type driving wheel of the electric scooter, the annular damping ring is shaped like a polygonal ring, each side of the annular damping ring is arcuately sunken inward, the concave-convex deformation teeth are arranged at the middle parts of the sides, and deformation-promoting notches are formed in two sides of the sides respectively.

Compared with the prior art, the present invention has the following advantages:

1. According to the present invention, the clutch state locking structure is arranged between the power shaft and the wheel body, so that the stability of the state can be maintained when the power shaft and the wheel body are in a transmission connection state or a mutual separation state, and switching between the two states caused by some accidental external factors is avoided, thereby ensuring the smooth use of the electric scooter, preventing accidents that cause harm to users and greatly improving the safety.

2. According to the present invention, the convex teeth and the grooves are distributed uniformly in a circumferential direction, so that the engagement action of the wheel body and the clutch part is facilitated; meanwhile, when the wheel body is engaged with the clutch part, an engagement force can be distributed uniformly and the stability can be enhanced.

3. According to the present invention, the first leading-in inclined surface and the second leading-in inclined surface are arranged at the opposite positions of the convex teeth and the grooves respectively, so that the convex teeth is conveniently inserted into the grooves and engaged with the grooves.

Figure 1:
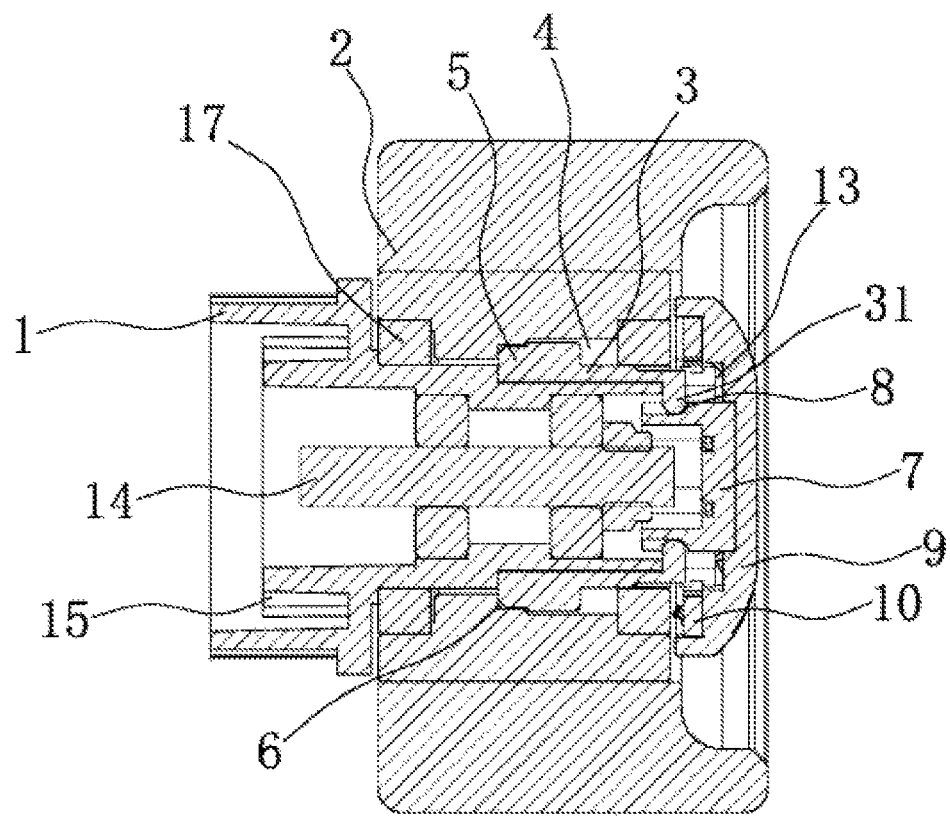
FIG. 1 is a sectional view according to the present invention.

In the drawings: power shaft 1, wheel body 2, clutch part 3, annular space 4, convex tooth 5, groove 6, rotary driving piece 7, spiral sliding groove 8, control rotary knob 9, annular damping ring 10, concave-convex deformation tooth 11, concave-convex body 12, annular groove 13, central supporting shaft 14, motor power input structure 15, first bearing 16, second bearing 17, axial sunken groove 18, deformation-promoting notch 19, sliding protrusion 31, sliding strip 32, first leading-in inclined surface 51, second leading-in inclined surface 61.

DETAILED DESCRIPTION OF EMBODIMENTS

The present invention will be further described in detail in combination with the accompanying drawings and the specific embodiments.

as shown in FIG. 1, a clutch type driving wheel of an electric scooter includes a wheel body 2 and a power shaft 1 penetrating through the center of the wheel body 2, wherein a motor power input structure 15 is arranged at one end of the power shaft 1, a central supporting shaft 14 penetrates through the power shaft 1, at least one first bearing 16 is arranged between the power shaft 1 and the central supporting shaft 14, at least one second bearing 17 is arranged between the power shaft 1 and the wheel body 2, a controlled clutch structure which enables the wheel body 2 to be circumferentially positioned relative to the power shaft 1 or enables the wheel body 2 to circumferentially rotate relative to the power shaft 1 when the controlled clutch structure acts is arranged between the power shaft 1 and the wheel body 2, and a clutch state locking structure is arranged on the controlled clutch structure.

The driving motor drives the power shaft 1 through the motor power input structure 15 to rotate, the central supporting shaft 14 provides a radial supporting force to the power shaft 1 through the first bearing 16, the power shaft 1 provides a radial supporting force to the wheel body 2 through the second bearing 17, the power shaft 1 and the wheel body 2 may rotate around the central supporting shaft 14 as a center, the controlled clutch structure is arranged between the power shaft 1 and the wheel body 2, the controlled clutch structure may enable the power shaft 1 and the wheel body 2 to be in transmission connection (circumferentially fixed) or be separated mutually (circumferentially separated) through action, and the clutch state locking structure may lock the controlled clutch structure, so that the controlled clutch structure cannot easily act, that is, the controlled clutch structure does not act to change the connection state between the power shaft 1 and the wheel body 2 under the influence of the external accidental factors; therefore, the clutch state locking structure is arranged between two rotating pieces to ensure that the state stability can be maintained when the two rotating pieces are in a transmission connection state or a mutual separation state, and switching between the two states caused by some accidental external factors is avoided, thereby ensuring the smooth use of the product with the clutch mechanism and preventing accidents that cause harm to users.

Specifically, the controlled clutch structure is arranged on the power shaft 1, the controlled clutch structure includes a clutch part 3 capable of moving axially along the power shaft 1 so as to enable the wheel body 2 to be circumferentially positioned relative to the power shaft 1 or enable the wheel body 2 to circumferentially rotate relative to the power shaft 1, the clutch part 3 is connected to a driving structure capable of converting rotating motion into axial movement of the clutch part 3 along the power shaft 1, and the clutch state locking structure is arranged between the driving structure and the power shaft 1.

Figure 3:
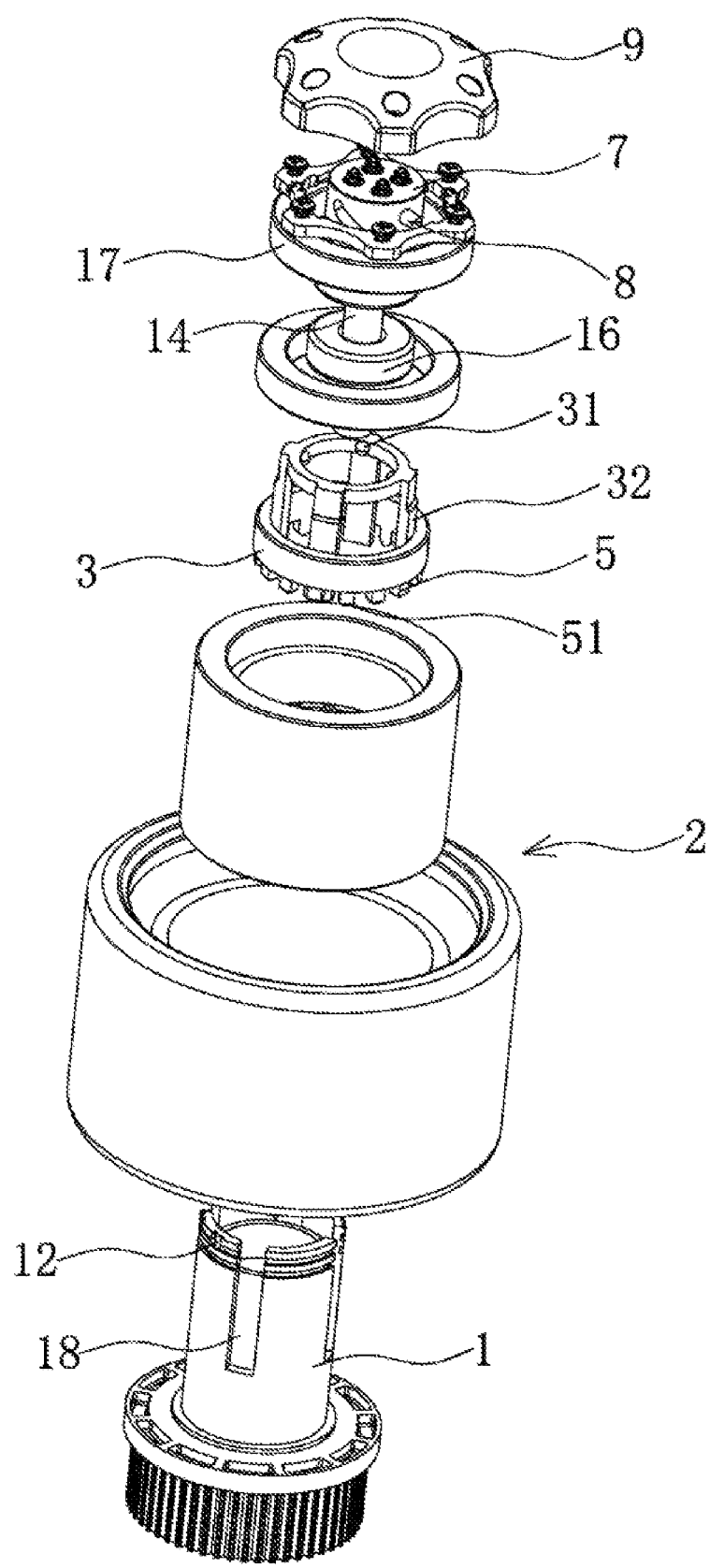
FIG. 3 is an exploded view according to the present invention.

The power shaft 1 may drive the clutch part 3 to rotate circumferentially and synchronously, and the clutch part 3 may slide axially relative to the power shaft 1, which may be realized through cooperation between the sunken grooves 18 and the sliding strips 32. For example, as shown in FIG. 3, the circumferential positioning and axial sliding structure includes several axial sunken grooves 18 arranged on the power shaft 1 and several sliding strips 32 arranged on the clutch part 3, the sliding strips 32 and the axial sunken grooves 18 are arranged in a one-to-one correspondence way, and the sliding strips 32 are arranged in the axial sunken grooves 18, so that the sliding strips 32 only can slide along the axial sunken grooves 18 when sliding, and the clutch part 3 only can slide axially relative to the power shaft 1.

The clutch part 3 realizes the transmission connection or mutual separation with the wheel body by sliding along an axis direction of the power shaft 1, for example, a concave-convex engagement structure may be arranged between the clutch part 3 and the wheel body 2. When the clutch part is axially forward, the concave-convex engagement structure is engaged so as to circumferentially position the power shaft 1 and the wheel body 2. When the clutch part 3 is axially backward, the concave-convex engagement structure is separated so as to circumferentially separate the power shaft 1 and the wheel body 2.

Figure 2:
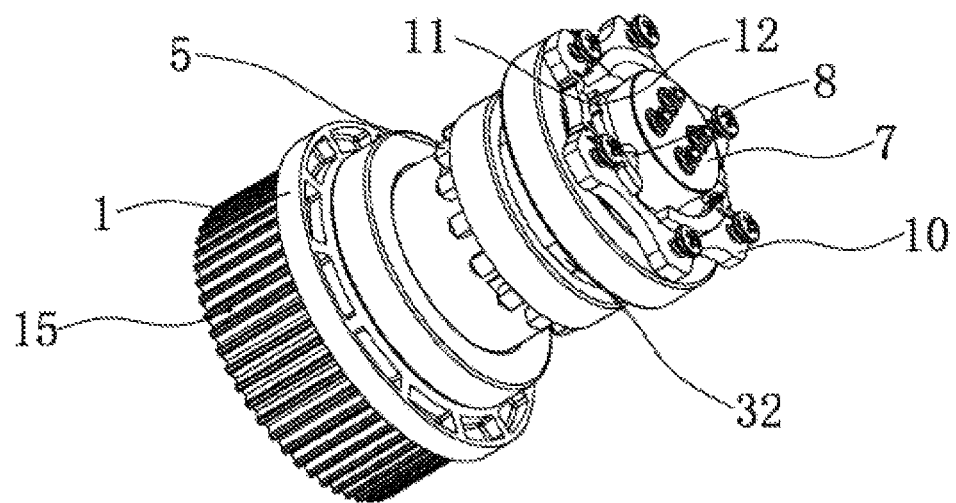
FIG. 2 is a partial structural schematic diagram according to the present invention.

The clutch part 3 slides along the axis direction of the power shaft 1 by rotating the driving structure. According to the present invention, a specific structure of the driving structure capable of converting rotating motion into linear motion is not limited, may adopt a screw rod sliding block structure, or may also adopt a structure as shown in FIG. 1 and FIG. 2. The driving structure includes a rotary driving piece 7, the rotary driving piece 7 is provided with several spiral sliding grooves 8 distributed at intervals in a circumferential direction, the clutch part 3 is provided with several sliding protrusions 31 distributed at intervals in the circumferential direction, the spiral sliding grooves 8 and the sliding protrusions 31 are arranged in a one-to-one correspondence way and are in sliding connection, the rotary driving piece 7 is fixedly connected to a control rotary knob 9, the clutch state locking structure is arranged between the control rotary knob 9 and the power shaft 1, the control rotary knob 9 rotates to enable the rotary driving piece 7 to rotate synchronously, the spiral sliding grooves 8 distributed on the surface of the rotary driving piece 7 at intervals in the circumferential direction rotate, the sliding protrusions 31 positioned in the spiral sliding grooves 8 slide along the spiral sliding grooves 8, and since the spiral sliding grooves 8 are spiral along the axial direction of the power shaft 1, the sliding protrusions 31 drive the clutch part 3 to slide along the axis direction of the power shaft 1.

The control rotary knob 9 may be a polygon or may be a circle with an inward concave arc, so that when the control rotary knob rotates, a user has an appropriate point of force application.

Preferably, an annular space 4 is formed between the power shaft 1 and the wheel 2, and the clutch part 3 is arranged in the annular space 4, so that the action of the clutch part 3 may be limited in the annular space 4, which plays a certain limiting guidance role.

Figure 4:
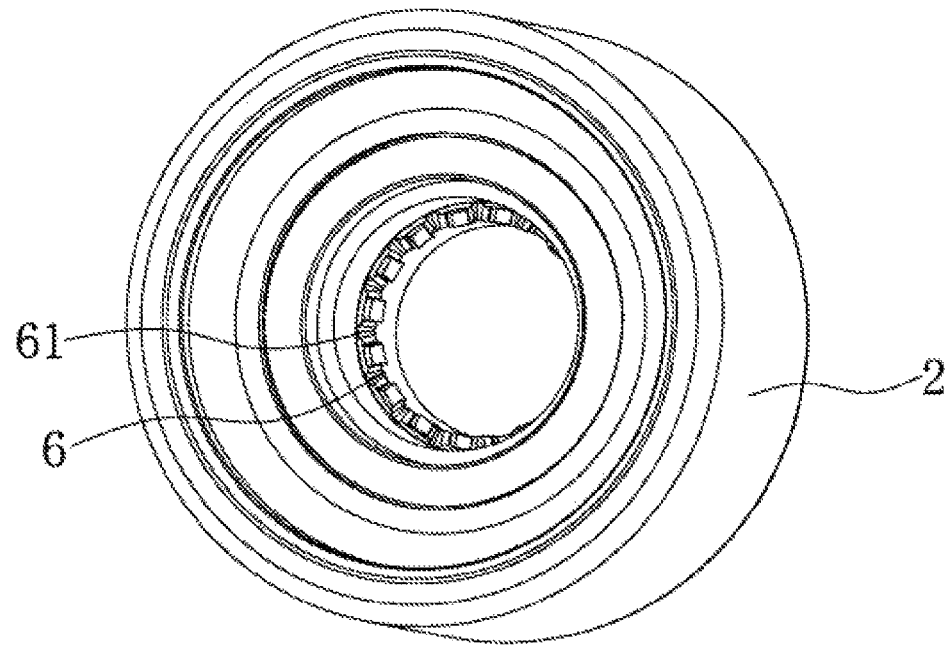
FIG. 4 is a structural schematic diagram of a wheel body.

In combination with FIG. 3 and FIG. 4, the clutch part 3 is cylindrical and sleeves the power shaft 1, a circumferential positioning and axial sliding structure is arranged between the clutch part 3 and the power shaft 1, several convex teeth 5 distributed uniformly in a circumferential directional are arranged at the front end of the clutch part 3, several grooves 6 distributed uniformly in the circumferential direction are formed in an inner side of the wheel body 2, the convex teeth 5 can be arranged corresponding to the grooves 6 and can be inserted into each other, and the clutch part 3 slides along an axis direction of the power shaft 1. The power shaft 1 and the wheel body 2 are in transmission connection when the convex teeth 5 are inserted into the grooves 6. When the convex teeth 5 are removed from the grooves 6, the power shaft 1 and the wheel body 2 are mutually separated, and the convex teeth 5 and the grooves 6 are distributed uniformly in the circumferential direction, thereby facilitating the engagement action of the wheel body 2 and the clutch part 3. Meanwhile, when the wheel body 2 and the clutch part 3 are engaged, the engagement force can be distributed uniformly and the stability can be enhanced.

Preferably, at least one first leading-in inclined surface 51 is arranged at the front end of each of the convex teeth 5; and at least one second leading-in inclined surface 61 is arranged at a notch of each of the grooves 6, the first leading-in inclined surface 51 and the second leading-in inclined surface 61 are arranged at the opposite position of the convex teeth 5 and the grooves 6 respectively, so that the convex teeth 5 are conveniently inserted into the grooves 6 and are engaged with the grooves 6.

Figure 5:
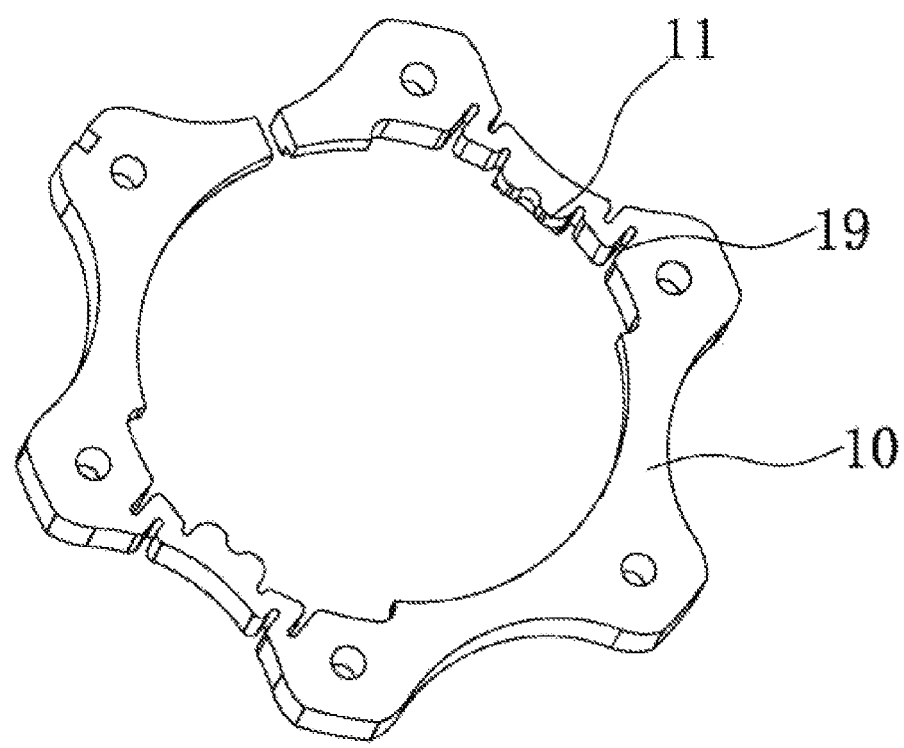
FIG. 5 is a structural schematic diagram of an annular damping ring.

In combination with FIG. 1, FIG. 2 and FIG. 5, the clutch state locking structure includes an annular damping ring 10, the annular damping ring 10 is provided with several concave-convex deformation teeth 11, several concave-convex bodies are arranged at an outer end of the wheel body 2, the annular damping ring 10 sleeves the periphery of the power shaft 1, rotary blockage is realized after the concave-convex deformation teeth 11 of the annular damping ring 10 pass over the concave-convex bodies 12, the annular damping ring 10 is fixedly connected to the control rotary knob 9, an annular groove 13 is formed at the periphery of the power shaft 1, the concave-convex bodies 12 are arranged in the annular groove 13, the annular damping ring 10 is embedded in the annular groove 13, the annular damping ring 10 is shaped like a polygonal ring, each side of the annular damping ring is arcuately sunken inward, the concave-convex deformation teeth 11 are arranged at the middle parts of the sides, and deformation-promoting notches 19 are formed in two sides of the sides respectively.

The control rotary knob 9 rotates to drive the annular damping ring 10 to rotate synchronously until the concave-convex deformation teeth 11 pass over the concave-convex bodies 12, so that the annular damping ring 10 and the concave-convex bodies 12 are mutually clamped to lock the clutch part 3, wherein the annular damping ring 10 is shaped like a polygonal ring, each side of the annular damping ring is arcuately sunken inward, the concave-convex deformation teeth 11 are arranged at the middle parts of the sides, and deformation-promoting notches 19 are formed in two sides of the sides respectively, so that the annular damping ring 10 may deform by compressing the deformation-promoting notch 19, and the concave-convex deformation teeth 11 may pass over the concave-convex bodies 12 conveniently.

Preferably, the annular damping ring 10 is provided with a mounting notch for mounting the annular damping ring 10 into the annular groove 13, that is, the annular damping ring 10 is C-shaped, so that when the annular damping ring 10 is mounted into the annular groove 13, an inner diameter of the annular damping ring 10 may be shrunk by compressing the mounting notch, thereby facilitating mounting operation.

The working principle of the present invention is: during use, the driving motor drives the power shaft 1 through the motor power input structure 15 to rotate, the control rotary knob 9 rotates to drive the rotary driving piece 7 to rotate synchronously when the wheel body 2 need to be in transmission connection with the power shaft 1, the sliding protrusions 31 slide along the spiral sliding grooves 8 so as to drive the clutch part 3 to slide away from the control rotary knob 9, the clutch part 3 slides axially under the cooperative guide action of the sliding strips 32 and the axis sunken grooves 18, the convex teeth 5 are embedded into the grooves 6, the power shaft 1 is in transmission connection with the wheel body 2, and at this time, the concave-convex deformation teeth 11 just pass over the concave-convex bodies 12, so that the concave-convex bodies and the annular damping ring 10 are clamped mutually. When the wheel body 2 rotates by itself, that is, needs to be separated from the power shaft 1, a larger force is applied to a direction of rotating the control rotary knob 9, so that the concave-convex bodies 12 are removed from the clamping force of the annular damping ring 10 and rotate, the sliding protrusions 31 slide along the spiral sliding grooves 8 so as to drive the clutch part 3 to slide close to the control rotary knob 9, the clutch part 3 slides axially under the cooperative guidance action of the sliding strips 32 and the axis sunken grooves 18, the convex teeth 5 are removed from the grooves 6, the power shaft 1 and the wheel body 2 are separated from each other, and at this time, the concave-convex deformation teeth 11 on the other side just pass over the concave-convex bodies 12, so that the concave-convex bodies 12 and the annular damping ring 10 are mutually clamped; therefore, according to the present invention, the clutch state locking structure is arranged between the power shaft 1 and the wheel body 2, the state stability can be maintained when the power shaft 1 and the wheel body 2 are in a transmission connection state or a mutual separation state, and switching between the two states caused by some accidental external factors is avoided, thereby ensuring the smooth use of the electric scooter, preventing accidents that cause harm to users and greatly improving the safety.

The specific embodiments described herein are only for illustrating the spirit of the present invention. A person skilled in the art can make various modifications or supplements to the specific examples described or replace them in a similar manner, but it may not depart from the spirit of the present invention or the scope defined by the appended claims.

Although terms such as power shaft 1, wheel body 2, clutch part 3, annular space 4, convex tooth 5, groove 6, rotary driving piece 7, spiral sliding groove 8, control rotary knob 9, annular damping ring 10, concave-convex deformation tooth 11, concave-convex body 12, annular groove 13, central supporting shaft 14, motor power input structure 15, first bearing 16, second bearing 17, axial sunken groove 18, deformation-promoting notch 19, sliding protrusion 31, sliding strip 32, first leading-in inclined surface 51 and second leading-in inclined surface 61 are widely used in the specification, the possibility of using other terms is not excluded. These terms are used only for more conveniently describing and explaining the essence of the present invention and the interpretation of them as any additional limitation is against the spirit of the present invention.

The invention claimed is:

1. A clutch type driving wheel of an electric scooter, comprising:
   a wheel body; and
   a power shaft penetrating through the center of the wheel body,
   wherein a motor power input structure is arranged at one end of the power shaft, a central supporting shaft penetrates through the power shaft, at least one first bearing is arranged between the power shaft and the central supporting shaft, at least one second bearing is arranged between the power shaft and the wheel body,
   a controlled clutch structure is arranged between the power shaft and the wheel body,
   when the controlled clutch structure acts, the controlled clutch structure enables the wheel body to be circumferentially positioned relative to the power shaft, or enables the wheel body to circumferentially rotate relative to the power shaft, and
   a clutch state locking structure is arranged on the controlled clutch structure.

2. The clutch type driving wheel of the electric scooter according to claim 1, wherein the controlled clutch structure is arranged on the power shaft, the controlled clutch structure comprises a clutch part capable of moving axially along the power shaft so as to enable the wheel body to be circumferentially positioned relative to the power shaft or enable the wheel body to circumferentially rotate relative to the power shaft, the clutch part is connected to a driving structure capable of converting rotating motion into axial movement of the clutch part along the power shaft, and the clutch state locking structure is arranged between the driving structure and the power shaft.

3. The clutch type driving wheel of the electric scooter according to claim 2, wherein an annular space is formed between the power shaft and the wheel body, the clutch part is arranged in the annular space, a concave-convex engagement structure is arranged between a front end of the clutch part and the wheel body, the concave-convex engagement structure is engaged when the clutch part is axially forward so as to circumferentially position the power shaft and the wheel body, the concave-convex engagement structure is separated when the clutch part is axially backward so as to circumferentially separate the power shaft and the wheel body, the rear end of the clutch part is connected to the driving structure, and the driving structure extends at least partially outside the annular space.

4. The clutch type driving wheel of the electric scooter according to claim 3, wherein the clutch part is cylindrical and sleeves the power shaft, a circumferential positioning and axial sliding structure is arranged between the clutch part and the power shaft, the concave-convex engagement structure comprises several convex teeth which are arranged at the front end of the clutch part and distributed uniformly in a circumferential direction and several grooves which are formed in the inner side of the wheel body and distributed uniformly in the circumferential direction, and the convex teeth are capable of being arranged corresponding to the grooves and capable of being inserted into each other.

5. The clutch type driving wheel of the electric scooter according to claim 4, wherein at least one first leading-in inclined surface is arranged at the front end of each of the convex teeth; and at least one second leading-in inclined surface is arranged at a notch of each of the grooves.

6. The clutch type driving wheel of the electric scooter according to claim 4, wherein the circumferential positioning and axial sliding structure comprises several axial sunk grooves arranged on the power shaft and several sliding strips arranged on the clutch part, and the sliding strips are arranged in one-to-one correspondence to the axial sunk grooves and are arranged in the axial sunk grooves.

7. The clutch type driving wheel of the electric scooter according to claim 2, wherein the driving structure comprises a rotary driving piece, the rotary driving piece is provided with several spiral sliding grooves distributed at intervals in a circumferential direction, the clutch part is provided with several sliding protrusions distributed at intervals in the circumferential direction, and the spiral sliding grooves and the sliding protrusions are arranged in one-to-one correspondence manner and are in sliding connection; and the rotary driving piece is fixedly connected to a control rotary knob, and the clutch state locking structure is arranged between the control rotary knob and the power shaft.

8. The clutch type driving wheel of the electric scooter according to claim 7, wherein the clutch state locking structure comprises an annular damping ring, several concave-convex deformation teeth are arranged on the annular damping ring, several concave-convex bodies are arranged at the outer end of the power shaft, the annular damping ring sleeves the periphery of the power shaft, rotary blockage is realized after the concave-convex deformation teeth of the annular damping ring extends over the concave-convex bodies, and the annular damping ring is fixedly connected to the control rotary knob.

9. The clutch type driving wheel of the electric scooter according to claim 8, wherein an annular groove is formed at the periphery of the power shaft, the concave-convex bodies are arranged in the annular groove, and the annular damping ring is embedded in the annular groove.

10. The clutch type driving wheel of the electric scooter according to claim 8, wherein the annular damping ring is shaped like a polygonal ring having a plurality of sides, each side of the annular damping ring is arcuately sunken inward, the concave-convex deformation teeth are arranged at the middle parts of at least one side of the plurality of sides, and deformation-promoting notches are formed in two ends of the at least one side respectively.

* * * * *